(12) United States Patent
Carter et al.

(10) Patent No.: US 9,033,581 B2
(45) Date of Patent: May 19, 2015

(54) DYNAMICALLY-LUBRICATED BEARING AND METHOD OF DYNAMICALLY LUBRICATING A BEARING

(75) Inventors: Bruce Alan Carter, West Chester, OH (US); Pradeep Hemant Sangli, Bangalore (IN); Santosh Kumar Potnuru, Bangalore (IN); Deepak Govindan, Bangalore (IN)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 13/269,680

(22) Filed: Oct. 10, 2011

(65) Prior Publication Data

US 2013/0087412 A1 Apr. 11, 2013

(51) Int. Cl.
F16C 19/00 (2006.01)
F16C 33/66 (2006.01)
F16C 33/58 (2006.01)

(52) U.S. Cl.
CPC ......... *F16C 33/6685* (2013.01); *F16C 33/6677* (2013.01); *F16C 2360/23* (2013.01); *F16C 33/583* (2013.01)

(58) Field of Classification Search
CPC ............. F16C 33/6681; F16C 33/6614; F16C 33/6651; F16C 33/6629; F16C 33/6685
USPC .................. 384/472, 473, 474, 475
See application file for complete search history.

(56) References Cited

U.S. PATENT DOCUMENTS

| | | | |
|---|---|---|---|
| 3,179,478 A * | 4/1965 | Readdy | 384/472 |
| 3,350,147 A | 10/1967 | Hingley | |
| 3,722,967 A | 3/1973 | Lewis | |
| 4,194,797 A | 3/1980 | Hormann | |
| H539 H * | 11/1988 | Sievert | 384/614 |
| 5,749,660 A | 5/1998 | Dusserre-Telmon et al. | |
| 6,261,003 B1 | 7/2001 | Dusserre-Telmon | |
| 7,600,921 B2 * | 10/2009 | Moller | 384/462 |
| 2004/0032998 A1 * | 2/2004 | Iwata et al. | 384/513 |
| 2008/0050060 A1 * | 2/2008 | Norihisa | 384/473 |

(Continued)

FOREIGN PATENT DOCUMENTS

EP 2479446 A2 7/2012

OTHER PUBLICATIONS

Search Report and Written Opinion for corresponding International Application No. PCT/US2012/054969, dated Dec. 7, 2012.

*Primary Examiner* — Marcus Charles
*Assistant Examiner* — Yamilka Pinero Medina
(74) *Attorney, Agent, or Firm* — General Electric Company; Pamela A. Kachur

(57) ABSTRACT

Dynamically-lubricated bearings and methods of dynamically lubricating bearings, including bearings used in gas turbine engines. Such a bearing includes an inner race having an inner race groove between a pair of inner race cage lands, an outer race having an outer race groove between a pair of outer race cage lands and opposes the inner race groove, rolling elements disposed between the inner and outer races and in rolling contact with the inner and outer race grooves, and a cage disposed between the inner and outer races to maintain separation between the rolling elements. A lubricant is introduced into a cavity between the inner and outer races, and rotation of the inner race relative to the outer race causes the lubricant to exit the cavity through recessed surface features in at least one of the inner and outer race cage lands.

17 Claims, 3 Drawing Sheets

(56) References Cited

U.S. PATENT DOCUMENTS

2010/0129020 A1* 5/2010 Gibbons ................ 384/548
2012/0033907 A1* 2/2012 Huhnke et al. ................ 384/473
2012/0189235 A1* 7/2012 McNeil et al. ................ 384/475

\* cited by examiner

DYNAMICALLY-LUBRICATED BEARING AND METHOD OF DYNAMICALLY LUBRICATING A BEARING

BACKGROUND OF THE INVENTION

The present invention generally relates to bearings and more particularly to bearings of the type that are dynamically lubricated, wherein the bearings are configured to inhibit viscous heating of the lubricant and thereby operate at relatively lower temperatures.

FIG. 1 schematically represents a high-bypass turbofan engine 10 of a type known in the art. The engine 10 is schematically represented as including a nacelle 12 and a core engine module 14. A fan assembly 16 located in front of the core module 14 includes an array of fan blades 18. The core module 14 is represented as including a high-pressure compressor 22, a combustor 24, a high-pressure turbine 26 and a low-pressure turbine 28. Air is drawn into the inlet duct 20 of the engine 10 and then compressed by the compressor 22 before being delivered to the combustor 24, where the compressed air is mixed with fuel and ignited to produce hot combustion gases that pass through the turbines 26 and 28 before being exhausted through a primary exhaust nozzle 30. To generate additional engine thrust, a large portion of the air that enters the fan assembly 16 is bypassed through an annular-shaped bypass duct 32 before exiting through a fan exit nozzle 34.

FIG. 1 schematically represents the high-pressure compressor 22 and high-pressure turbine 26 as mounted on the same shaft 36 so that the flow of hot exhaust gases that pass through the high-pressure turbine 26 turns the turbine 26 as well as the compressor 22 via the shaft 36. The shaft 36 is supported with multiple rolling element bearings, of which a ball bearing 38 is represented in FIG. 1 located near the entrance of the compressor 22. The shaft 36 is mounted within an inner race of the bearing 38, while an outer race of the bearing 38 is supported by a static structure of the core engine module 14. From FIG. 1, it should be apparent that the axis of the bearing 38 coincides with the centerline 35 of the engine 10.

FIG. 2 represents a cross-sectional view of a portion of the bearing 38 of FIG. 1. As a ball bearing, the bearing 38 is shown as comprising an inner race 40, an outer race 42, rolling elements (balls) 44 (of which only one is shown in FIG. 2), and a cage 46. The rolling elements 44 reside within grooves 50 and 52 defined in opposing surfaces of the races 40 and 42, respectively, such that in combination the grooves 50 and 52 define the load-bearing contact surfaces of the bearing 38. The cage 46 serves to maintain separation between the rolling elements 44. In FIG. 2, each groove 50 and 52 is represented as having a semi-spherical cross-sectional shape that closely matches the curvature of the rolling elements 44, though with a slightly larger radius than the rolling element 44. Such a shape is commonly referred to as a circular arch, and provides a single contact point between each rolling element and each individual race 40 and 42. The contact points or patches 54 and 56 are diametrically opposed as schematically represented in FIG. 2. The term "patches" refers to the fact that a true point contact does not exist when a bearing is loaded, and that the contact patches 54 and 56 have elliptical shapes caused by loading between the rolling elements 44 and the races 40 and 42.

Due to the high rotational speeds required of the shaft 36, the bearing 38 must operate at high rotational speeds. Specifically, though the outer race 42 does not rotate, the inner race 40 rotates at the same speed as the shaft 36 and the rolling elements 44 therebetween rotate around the inner race 42 at a lower speed than the inner race 42. High-speed ball bearings of the type represented in FIG. 1 are often dynamically cooled with a lubricant that flows through the bearing 38. In FIG. 2, the inner race 40 of the bearing 38 is provided with under-race lubrication features in the form of multiple inlets 48 through which a lubricant (typically oil) is introduced into an annular-shaped cavity 58 defined by and between the inner and outer races 40 and 42 of the bearing 38. The lubricant provides both lubrication and cooling of the rolling elements 44 and cage 46 within the cavity 58. Under the influence of centrifugal forces caused by the spinning inner race 40, the lubricant supplied through the inlets 48 flows radially outward to contact the cage 46, the rolling elements 44, and the outer race 42. As represented in FIG. 2, because the bearing 38 is provided with an under-race lubrication system, the cage 46 is typically configured so that it bears against cage lands 60 on the inner race 40.

Because the outer race 42 does not rotate and the inner race 40, rolling elements 44 and cage 46 are moving at different speeds, the lubricant within the cavity 58 tends to churn, which as used herein refers to nonhomogeneous flow patterns within the cavity 58. Analysis has shown that churning primarily occurs at the outer race 42, and more particularly within the groove 52 of the outer race 42, where the lubricant tends to accumulate before exiting the bearing 38. In conventional dynamically-lubricated bearing designs, the lubricant exits the bearing 38 at the inner and outer diameters of the cage 46 on both axial ends 62 and 64 of the bearing 38, with the majority of the lubricant exiting at the outer diameter of the cage 46 in view of the position of the cage 46 against the inner race cage lands 60. Furthermore, when the bearing 38 is operating with an axial load (as represented in FIG. 2), a majority of the lubricant will exit at the outer diameter of the cage 46 and on the unloaded side of the bearing 38.

Various approaches have been proposed to promote the lubrication of rolling element bearings, including efforts to reduce heat generation at high rotational speeds. One such approach disclosed in U.S. Pat. No. 5,749,660 to Dusserre-Telmon et al. is the inclusion of a drain feature in the outer race. The drain features are orifices having entrances that are located in the groove of the outer race and exits that are located on the outer circumference of the outer race, so that the lubricant drains from the bearing by flowing completely through the outer race in a radially outward direction. The grooves of the inner and outer races do not have circular cross-sectional shapes matching the curvature of the rolling elements, but instead are described as having rather conical shapes that define vertices which form part of a central circumference of each groove. As a result, the rolling elements never cover the drain orifices located in the outer race groove, but instead touch the outer race at two lateral contact patches on each side of the orifices. Such a configuration is similar to conventional bearing races that have what is commonly referred to as a gothic arch, in which case the race is defined by two radii with different axes of curvature, as opposed to the aforementioned circular arch defined by a single radius. Similarly, the rolling elements contact the inner race groove at two lateral contact points on each side of inlet orifices that are formed in the inner race to introduce the lubricant into the bearing, with the result that each rolling element can have as few as two and as many as four contact points with the inner and outer races.

While not intending to promote any particular interpretation of U.S. Pat. No. 5,749,660, it appears that the four-point contact may not be capable of operating with a low axial load conditions that would occur when the rotor thrust load changes direction during transitions from low to high speed conditions, as would be required in most gas turbine applications of the type represented in FIG. 1. Furthermore, the drain orifices may contribute significant stress concentrations in the outer race and reduce the ability of the bearing to survive ultra-high load events, such as fan blade out conditions.

BRIEF DESCRIPTION OF THE INVENTION

The present invention provides dynamically-lubricated bearings and to methods of dynamically lubricating bearings, including bearings of the type suitable for use in gas turbine engines.

According to a first aspect of the invention, a dynamically-lubricated bearing includes an inner race having an inner race groove between a pair of inner race cage lands, an outer race circumscribing the inner race and having an outer race groove that is between a pair of outer race cage lands and opposes the inner race groove, rolling elements disposed between the inner and outer races and in rolling contact with the inner and outer race grooves, and a cage disposed between the inner and outer races to maintain separation between the rolling elements. The inner and outer races define an annular-shaped cavity therebetween, and at least one of the pairs of inner and outer race cage lands is equipped with recessed surface features that define continuous channels that are formed in a surrounding surface of the inner and/or outer race cage lands. The surface features fluidically interconnect the cavity within the bearing to an external environment surrounding at least one of a pair of axial ends of the bearing.

Another aspect of the invention is a method of dynamically lubricating a bearing that comprises the elements described above. The method includes installing the bearing in a gas turbine engine so as to support a shaft that interconnects a compressor and a turbine of the gas turbine engine. A lubricant is introduced into the cavity between the inner and outer races, and the inner race is rotated relative to the outer race so that the lubricant is caused to exit the cavity through the surface features and enter the external environment surrounding the pair of axial ends of the bearing.

Another aspect of the invention is a method of dynamically lubricating, a bearing that comprises an inner race having an inner race groove between a pair of inner race cage lands, an outer race that has an outer race groove that is between a pair of outer race cage lands and opposes the inner race groove, rolling elements disposed between the inner and outer races and in rolling contact with the inner and outer race grooves, and a cage disposed between the inner and outer races to maintain separation between the rolling elements. The method includes introducing a lubricant into a cavity between the inner and outer races, and then rotating the inner race relative to the outer race so that the lubricant is caused to exit the cavity through recessed surface features in at least one of the inner and outer race cage lands. The lubricant exits the cavity through the surface to enter an external environment surrounding at least one axial end of the bearing.

A technical effect of the invention is the ability to reduce heat generation within bearings that are dynamically lubricated and operate at high rotational speeds. The reduction in heat generation is achieved by channeling the lubricant away from regions within the bearing that are prone to lubricant churning, such as the outer race groove, while providing a robust construction that is capable of withstanding ultra-high load events and thrust load crossovers, as would be required in many gas turbine applications.

Other aspects and advantages of this invention will be better appreciated from the following detailed description.

DETAILED DESCRIPTION OF THE INVENTION

Figure 3:
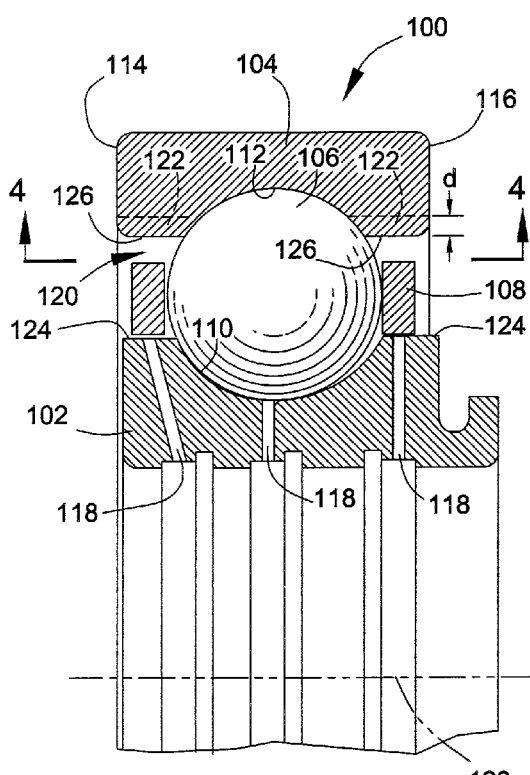
FIG. 3 is a fragmentary cross-sectional view of a rolling element bearing according to an embodiment of the present invention.

FIG. 3 schematically represents a rolling element bearing 100 for the purpose of describing aspects of the present invention. It should be noted that the drawings are drawn for purposes of clarity when viewed in combination with the following description, and therefore are not necessarily to scale. To facilitate the description of the bearing 100 provided below, the terms "vertical," "horizontal," "lateral," "front," "rear," "side," "forward," "rearward," "upper," "lower," "above," "below," "right," "left," etc., may be used in reference to the perspective of the orientation of the bearing 10 in FIG. 3, and therefore are relative terms and should not be otherwise interpreted as limitations to the construction, installation and use of the bearing 100.

Figure 2:
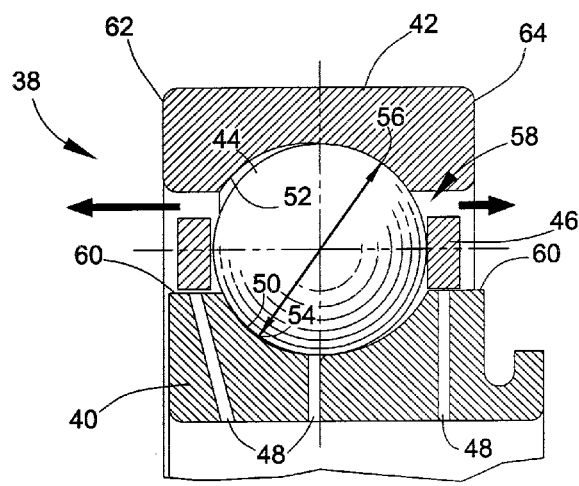
FIG. 2 is a fragmentary cross-sectional view of a rolling element bearing of a type known in the art.

As represented in FIG. 3, the bearing 100 has a similar construction to that of the bearing represented in FIG. 2. As such, the bearing 100 is represented as a ball bearing that comprises an inner race 102, an outer race 104 that circumscribes the inner race 102, rolling elements (balls) 106 (of which only one is shown in FIG. 3) between the inner and outer races 102 and 104, and a cage 108 that serves to maintain separation between the rolling elements 106. Each of the inner race 102, outer race 104 and cage 106 has an annular shape, as is typical for rolling element bearings. The rolling elements 106 reside within grooves 110 and 112 defined in opposing surfaces of the races 102 and 104, respectively. Each groove 110 and 112 is axially disposed between a pair of cage lands 124 and 126, respectively, defined on their corresponding inner or outer race 102 and 104. In combination, the grooves 110 and 112 define the load-bearing contact surfaces of the bearing 38. As with conventional ball bearings, the grooves 110 and 112 may have semi-spherical cross-sectional shapes that closely match the curvature of the rolling elements 106 to provide two or more contact patches between each rolling element 106 and the races 102 and 104, as was described in reference to FIG. 2. In particular, either or both of the inner and outer races 102 and 104 may have a traditional gothic arch shape or a traditional circular arch shape (according to the previously-noted definitions for these terms). In preferred embodiments of the invention, the inner race 102 has a gothic arch shape and the outer race 104 has a circular arch shape.

Figure 1:
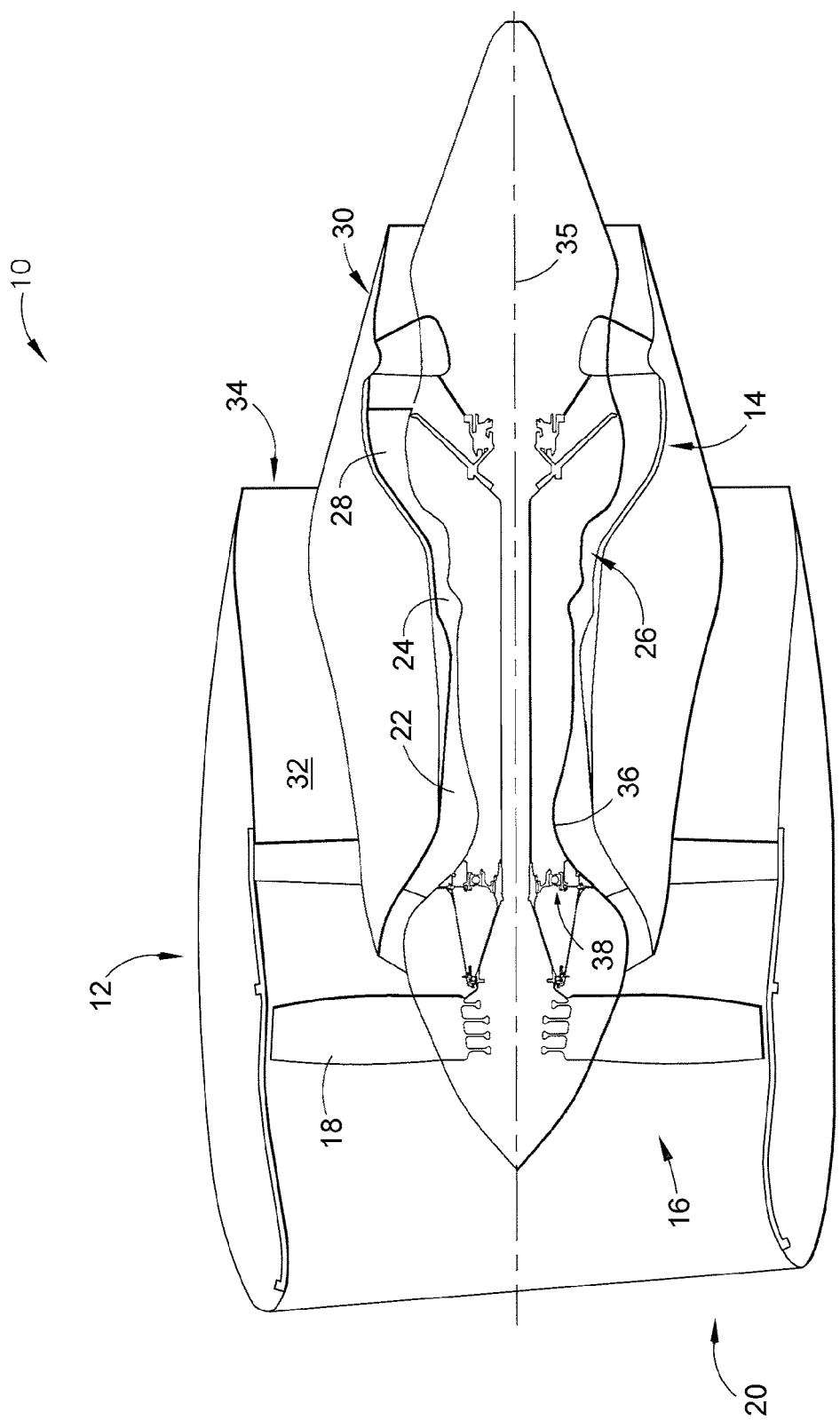
FIG. 1 schematically represents a cross-sectional view of a high-bypass turbofan engine.

The bearing 100 can be adapted for use in high-speed rotational applications, including mounting of the shaft 36 of FIG. 1. As previously described, typically in such applications the outer race 104 does not rotate, the inner race 102 rotates at the same speed as the shaft 36, and the rolling elements 106 rotate around the inner race 102 at a lower speed than the inner race 102. Also similar to the bearing 38 represented in FIG. 2, the bearing 100 is configured to be dynamically cooled with a lubricant that enters the bearing 100 through inlet orifices 118 located in the inner race 102, providing what may be referred to as an under-race lubrication system. With these orifices 118, the bearing 100 is provided with a lubrication capability in which a lubricant (typically oil) is introduced into an annular-shaped cavity 120 defined by and between the inner and outer races 102 and 104 of the bearing 100 to provide both lubrication and cooling of the rolling elements 106 and cage 108. Under the influence of centrifugal forces induced by the spinning inner race 102, the lubricant supplied through the orifices 118 flows radially outward to contact the cage 108, the rolling elements 106, and the outer race 104. FIG. 3 represents a preferred configuration in which three orifices 118 are present. With this approach, a relatively high percentage of the total lubricant flow can be caused to flow through the center orifice 118 to feed the rolling elements 106, while a smaller percentage of the total lubricant flow is delivered to each of the two remaining orifices 118 to lubricate the cage lands 124. Since the lubricant tends to centrifuge radially outward, a benefit of this configuration is that lubricant is provided directly to the cage lands 124, especially during critical operating phases such as start up and shut down when cage rubs are likely to occur.

Because the outer race 104 does not rotate and the inner race 102, rolling elements 106 and cage 108 rotate at different speeds, the lubricant within the cavity 120 would ordinarily tend to churn, particularly within the groove 112 of the outer race 104 where the lubricant would tend to accumulate before exiting the bearing 100. To alleviate this tendency, the bearing 100 is provided with surface features that dynamically promote the flow of lubricant out of the cavity 120, generally exiting at the inner and outer diameters of the cage 108 between the cage lands 124 and 126 at both axial ends 114 and 116 of the bearing 100. In FIG. 3, the surface features are represented as slots 122 defined in each of the pair of cage lands 126 on the outer race 104, and not the pair of cage lands 124 of the inner race 102, against which the cage 108 preferably bears due to the bearing 100 having an under-race lubrication system. As evident from both FIGS. 3 and 4, each slot 122 defines a continuous channel or passage between the outer race groove 112 and its corresponding axial face of the outer race 104, which in turn is disposed at one of the axial ends 114 or 116 of the bearing 100. As a result, each slot 122 defines a continuous channel or passage that is formed in the surrounding surface of one of the outer race cage lands 126, and fluidically interconnects the cavity 120 of the bearing 100, and particularly that portion of the cavity 120 defined by the groove 112 of the outer race 104, to the external environment surrounding one of the axial ends 114 and 116 of the bearing 100. By channeling the lubricant out of the outer race groove 112 to the surrounding environment, the invention is capable of reducing the viscous heat generation that would otherwise occur due to churning of the lubricant within the bearing cavity 120, and particularly that portion of the cavity 120 defined by the outer race groove 112.

Figure 4:
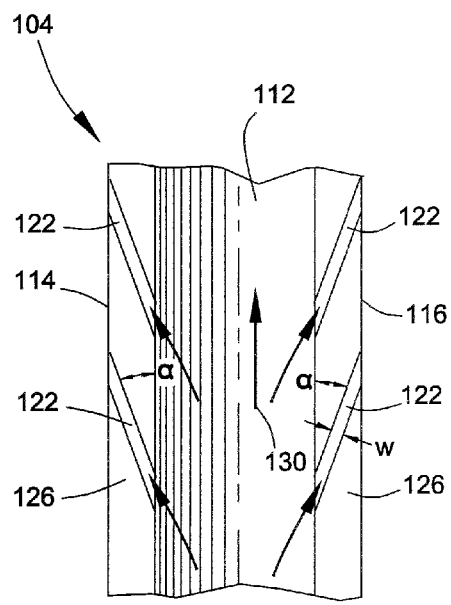
FIG. 4 represents a view of the bearing of FIG. 3 taken along line 4-4 of FIG. 3, and shows a pattern of slots defined in the bearing's outer race cage land according to an embodiment of the present invention.

As evident from FIG. 4, the slots 122 are angled relative to the axis 128 of the bearing 100 (FIG. 3), which coincides with the engine centerline 35 (FIG. 1), and therefore also to the direction of rotation of the inner race 102. As such, the slots 122 are also angled relative to the path defined by the outer race groove 112 and the direction 130 that the rolling elements 106 travel within the groove 112 (FIG. 4). The angled slots 122 capture the lubricant as it flows within the outer race groove 112 under the effect of the rolling elements 106 traveling within the groove 112. The slots 122 then direct the lubricant away from the outer race 104, and particularly out of the groove 112 of the outer race 104. As surface features defined in the cage lands 126 of the outer race 104, the slots 122 can be readily created by machining the lands 126 using a variety of conventional machining equipment.

The number, depth, width, and orientation of the slots 122 relative to the travel direction 130 of the rolling elements 106 can be readily tailored to promote the ability of the lubricant to exit the bearing 100 and reduce the degree of churning that occurs prior to the lubricant exiting the bearing 100. Preferred numbers, depths and widths of the slots 122 will depend in part on the size (diameter and axial length) of the bearing 100, the properties of the lubricant, and the desired flow rate of the lubricant through the bearing 100. For the application represented in FIG. 1, suitable depths (d in FIG. 3) for the slots 122 are believed to be about 0.03 inch (about 0.75 mm), though lesser and greater depths are foreseeable. The width (w in FIG. 4) of each slot 122 is preferably greater than its depth, with suitable widths believed to be about 0.12 to about 0.13 inch (about 3 to 3.3 mm), though lesser and greater widths are foreseeable. To provide an adequate flow capacity and reduce localized churning of the lubricant within the outer race groove 112, it is believed that at least one slot 122 should be provided for each rolling element 106 to promote a more efficient removal of lubricant from the outer race groove 112. Certain other geometrical considerations are believed to exist, including the desirability for the slots 122 to have flat sidewalls to promote the capture of lubricant from the outer race groove 112.

Figure 5:
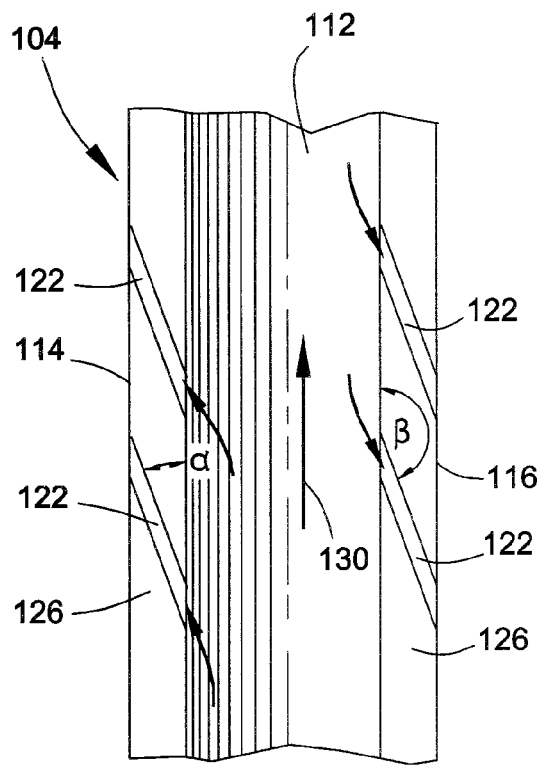
FIGS. 5 and 6 represent views similar to that of FIG. 4, but show patterns of slots according to alternative embodiments of the present invention.
Figure 6:
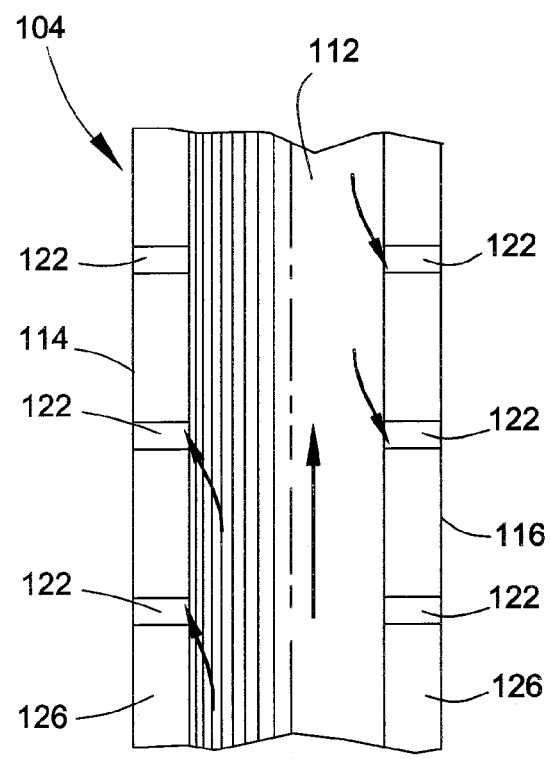

In FIG. 4, the slots 122 are represented as straight channels that are oriented so as to be inclined at an acute angle, $\alpha$, to the path defined by the outer race groove 112 and the direction 130 that the rolling elements 106 travel within the groove 112. Furthermore, the slots 122 on the separate cage lands 126 are mirror images of each other, such that the effect of the rolling elements 106 traveling within the groove 112 is essentially the same in regard to the manner in which the lubricant is captured and channeled away from the outer race 102 at the acute angle $\alpha$ to the travel direction 130 of the rolling elements 106 within the groove 112. This "mirror" configuration allows the functionality of the slots 122 to be realized regardless of the direction (forward or aft) in which axial loads are applied. The slots 122 represented in FIG. 4 are inclined at an angle ($\alpha$) of about thirty degrees to the travel direction 130 of the rolling elements 106 within the groove 112, though it is believed that other acute angles $\alpha$ can be used. In contrast, FIG. 5 represents an embodiment of the invention in which only one set of the slots 122 is disposed at an acute angle $\alpha$ (about thirty degrees) to the travel direction 130 of the rolling elements 106, while the other set is at an obtuse angle $\beta$ (about 150 degrees) to the travel direction 130. This configuration is particularly practical if only one axial end 114 or 116 of the bearing 100 is believed to significantly contribute to heat generation, in which case the bearing 100 can be installed in either direction and yet have slots 122 inclined at an acute angle to the travel direction 130, such that installation of the bearing 100 is not dependent on the direction of rotation. FIG. 6 represents yet another embodiment of the invention in which both sets of slots 122 are disposed approximately perpendicular to the travel direction 130 of the rolling elements 106. Though within the scope of the invention, models have indicated that the configuration represented in FIG. 6 would not be as effective as those of FIGS. 4 and 5, which have at least one set of slots 122 oriented at an acute angle to the travel direction 130. The slots 122 are represented in FIGS. 4, 5 and 6 as straight, though it is also foreseeable that the slots 122 could be formed to have an arcuate shape. A potential benefit of curved slots 122 would be that the capture angle for the lubricant could be more shallow (less than 30 degrees), and a curved shape could allow more slots 122 to be accommodated within an available space. Furthermore, it is foreseeable that the slots 122 on either or both outer race cage lands 126 could differ from each other, for example, the slots 122 could differ from each other in terms of their shape, width, depth and orientation.

The slots 122 are capable of more effectively removing lubricant from the outer race groove 112, and therefore reduce heat generation within the bearing 100 by reducing churning of the lubricant within the outer race groove 112. By reducing the heat generation within the bearing 100, the invention further has the capability of reducing the capacity of the lubrication system coolers that would otherwise be required to cool the bearings of a gas turbine engine. In turn, reducing the size of the coolers reduces the weight and performance losses of the engine and consequently improves the fuel consumption for the engine and aircraft.

The surface slots 122 depicted in FIGS. 4, 5 and 6 are also believed to provide advantages over prior attempts to reduce heat generation within dynamically-lubricated bearings of the type represented in FIG. 2. One advantage is that the slots 122 are limited to the outer race cage lands 126, which are nonfunctional surfaces of bearings equipped with an under-race lubrication system as a result of the cage 108 bearing against the cage lands 124 of the inner race 102 (as represented for the bearings 38 and 100 of FIGS. 2 and 3). By avoiding the use of drain orifices that pass entirely through the outer race 104 (as done in U.S. Pat. No. 5,749,660), the invention avoids any loss in structural integrity that would occur as a result of stress concentrations associated with through-holes in the outer race 104. As such, it is believe that the bearing 100 would be more capable of surviving ultra-high load events, such as fan blade out conditions.

Because the slots 122 are placed outside the outer race groove 112, the invention also avoids any concern for damage occurring to the rolling elements 106 as a result of contact with the slots 122. This advantage is in contrast to U.S. Pat. No. 5,749,660, whose race grooves must each be machined to have a conical shape so that the inlet and drain orifices formed in the race grooves never come into contact with the rolling elements. Consequently, the invention can make use of an inner groove 110 having a gothic arch shape, while the outer groove 112 may have a circular arch shape that more closely matches the curvature of the rolling elements 106. As a result, depending on the loading conditions, contact between each rolling element 106 and the races 102 and 104 may occur at two locations that are diametrically opposed (similar to what is schematically represented in FIG. 2), or at two locations to one side of the element 106, or at more than two locations. It is believed that, in contrast to the bearing of U.S. Pat. No. 5,749,660, the bearing 100 described above is likely to be more capable of operating with a thrust load crossover, as is typically required in gas turbine applications of the type represented in FIG. 1.

The invention can also be adapted to bearings that do not utilize under-race lubrication. For example, for bearings that are supplied a lubricant through a side jet directed at the cavity 120, the cage 108 could be configured to bear against the outer race cage lands 126, in which case the slots 122 could be formed in the inner race cage lands 124 in the same manner as described above for the slots 122 formed in the outer race cage lands 126.

From the above, it should be appreciated that the bearing 100 is well suited for installation in a variety of applications, in addition to gas turbine engines. Generally, the bearing 100 is installed so that the rotation of its rolling elements 106 results in the elements 106 circumferentially traveling between the inner and outer races 102 and 104 while contacting their respective grooves 110 and 112. A lubricant injected or otherwise delivered into the cavity 120 is then drawn from the cavity 120, more particularly from the race groove 110 or 112 of the race 102 or 104 in which the slots 122 are machined. The rotation of the inner race 102 and the motion of the rolling elements 106 through the outer race groove 112 effectively promote expulsion of the lubricant from the bearing cavity 120 through the slots 122. As such, the lubricant is not drained from the bearing cavity 120 through the outer race 104, but instead is drawn from the cavity 120 over at least one set of the cage lands 124 or 126 of the bearing 100, and therefore between the cage lands 124 and 126 and the cage 108 therebetween.

While the invention has been described in terms of specific embodiments, it is apparent that other forms could be adopted by one skilled in the art. For example, the physical configuration of the bearing 100 could differ from that shown, and various materials and processes could be used to construct and fabricate the bearing 100. Therefore, the scope of the invention is to be limited only by the following claims.

The invention claimed is:

1. A dynamically-lubricated ball bearing comprising:
an inner race having an inner race groove between a pair of inner race cage lands;
an outer race circumscribing the inner race so as to define an annular-shaped cavity therebetween, the outer race having an outer race groove that is between a pair of outer race cage lands and opposes the inner race groove;
rolling elements disposed between the inner and outer races and in rolling contact with the inner and outer race grooves;
a cage disposed between the inner and outer races to maintain separation between the rolling elements such that either the pair of inner race cage lands or the pair of outer race cage lands is a nonfunctional pair of cage lands;
means for introducing a lubricant into the cavity between the inner and outer races; and
recessed surface features in the outer pair of cage lands, the recessed surface features defining continuous channels that are formed in a surrounding surface of the outer pair of cage lands and fluidically interconnect the cavity to an external environment surrounding at least one of a pair of axial ends of the bearing, wherein the recessed surface features are adapted to remove the lubricant from the cavity through the recessed surface features and allow the lubricant to exit the cavity to enter the external environment.

2. The dynamically-lubricated bearing according to claim 1, wherein at least one of the inner and outer race grooves has a gothic arch shape.

3. The dynamically-lubricated bearing according to claim 1, wherein at least one of the inner and outer race grooves has a circular arch shape.

4. The dynamically-lubricated bearing according to claim 1, wherein the outer race groove has a circular arch shape corresponding to a curvature of the rolling elements and the rolling contact between each rolling element and the outer race groove exists at a single contact patch.

5. The dynamically-lubricated bearing according to claim 4, wherein the inner race groove has a gothic arch shape and the rolling contact between each rolling element and the inner race groove exists at two contact patches.

6. The dynamically-lubricated bearing according to claim 1, wherein the recessed surface features are at least equal in number to the number of rolling elements.

7. The dynamically-lubricated bearing according to claim 1, wherein the recessed surface features are straight.

8. The dynamically-lubricated bearing according to claim 1, wherein the recessed surface features are oriented so as to be inclined at an acute angle to a direction that the rolling elements travel within the inner and outer race grooves.

9. The dynamically-lubricated bearing according to claim 1, wherein the recessed surface features are oriented so as to be perpendicular to a direction that the rolling elements travel within the inner and outer race grooves.

10. The dynamically-lubricated bearing according to claim 1, wherein the lubricant introducing means comprises at least one orifice through the inner race.

11. A dynamically-lubricated ball bearing comprising:
an inner race having an inner race groove between a pair of inner race cage lands;
an outer race circumscribing the inner race so as to define an annular-shaped cavity therebetween, the outer race having an outer race groove that is between a pair of outer race cage lands and opposes the inner race groove;
rolling elements disposed between the inner and outer races and in rolling contact with the inner and outer race grooves;
a cage disposed between the inner and outer races to maintain separation between the rolling elements;
means for introducing a lubricant into the cavity between the inner and outer races; and
recessed surface features in the pair of outer race cage lands, the recessed surface features defining continuous channels that are formed in a surrounding surface of the outer race cage lands and fluidically interconnect the cavity to an external environment surrounding at least one pair of axial ends of the bearing, wherein the recessed surface features are adapted to remove the lubricant from the cavity through the recessed surface features and allow the lubricant to exit the cavity to enter the external environment.

12. The dynamically-lubricated bearing according to claim 11, wherein the recessed surface features of a first of the outer race cage lands are mirror images of the recessed surface features of a second of the outer race cage lands.

13. The dynamically-lubricated bearing according to claim 11, wherein the recessed surface features of a first of the outer race cage lands are oriented so as to be inclined at an acute angle to a direction that the rolling elements travel within the inner and outer race grooves, and the recessed surface features of a second of the outer race cage lands are oriented so as to be inclined at an obtuse angle to the direction that the rolling elements travel within the inner and outer race grooves.

14. The dynamically-lubricated bearing according to claim 11, wherein the recessed surface features have flat sidewalls to promote the capture of the lubricant within the cavity.

15. A method of dynamically lubricating the dynamically-lubricated bearing of claim 1, the method comprising:
installing the bearing in a gas turbine engine so as to support a shaft that interconnects a compressor and a turbine of the gas turbine engine;
introducing a lubricant into the cavity between the inner and outer races; and
rotating the inner race relative to the outer race so that the lubricant is caused to exit the cavity through the recessed surface features and enter the external environment surrounding the pair of axial ends of the bearing.

16. The method according to claim 15, wherein the recessed surface features are oriented so as to be inclined at an acute angle to a direction that the rolling elements travel within the inner and outer race grooves, and the rotating step causes the lubricant to be captured and channeled away from the cavity at the acute angle.

17. A method of dynamically lubricating a ball bearing that comprises an inner race having an inner race groove between a pair of inner race cage ands, an outer race that has an outer race groove that is between a pair of outer race cage lands and opposes the inner race groove, rolling elements disposed between the inner and outer races and in rolling contact with the inner and outer race grooves, and a cage disposed between the inner and outer races to maintain separation between the rolling elements, the method comprising:
introducing a lubricant into a cavity between the inner and outer races; and
rotating the inner race relative to the outer race so that the lubricant is caused to exit the cavity through recessed surface features defining continuous channels formed in the surrounding surface of the pair of outer race cage lands to enter an external environment surrounding at least one axial end of the bearing.

* * * * *

UNITED STATES PATENT AND TRADEMARK OFFICE
CERTIFICATE OF CORRECTION

PATENT NO.        : 9,033,581 B2
APPLICATION NO.   : 13/269680
DATED             : May 19, 2015
INVENTOR(S)       : Carter et al.

Page 1 of 1

It is certified that error appears in the above-identified patent and that said Letters Patent is hereby corrected as shown below:

In the specification

Column 3, Line 44, delete "lubricating," and insert -- lubricating --, therefor.

Column 4, Line 32, delete "bearing 10" and insert -- bearing 100 --, therefor.

Column 5, Line 31, delete "chum," and insert -- churn, --, therefor.

In the claims

Column 10, Line 29, Claim 17, delete "hall" and insert -- ball --, therefor.

Column 10, Line 31, Claim 17, delete "ands," and insert -- lands, --, therefor.

Signed and Sealed this
Ninth Day of February, 2016

Michelle K. Lee
*Director of the United States Patent and Trademark Office*